May 14, 1957 T. P. KINN ET AL 2,792,483

GENERATOR ARC PROTECTION CIRCUIT

Filed Dec. 29, 1951 2 Sheets-Sheet 1

WITNESSES:
E. A. McCloskey
R. G. Brodahl

INVENTORS
Theodore P. Kinn and
Richard H. Hagopian.
BY
F. E. Browder
ATTORNEY

May 14, 1957 T. P. KINN ET AL 2,792,483

GENERATOR ARC PROTECTION CIRCUIT

Filed Dec. 29, 1951 2 Sheets-Sheet 2

WITNESSES:
E. A. McBlakey
R. G. Brodahl

INVENTORS
Theodore P. Kinn and
Richard H. Hagopian.
BY
F. E. Browder
ATTORNEY

United States Patent Office 2,792,483

Patented May 14, 1957

2,792,483

GENERATOR ARC PROTECTION CIRCUIT

Theodore P. Kinn and Richard H. Hagopian, Baltimore, Md., assignors to Westinghouse Electric Corporation, East Pittsburgh, Pa., a corporation of Pennsylvania Application December 29, 1951, Serial No. 264,066

8 Claims. (Cl. 219—10.77)

Our invention relates to high frequency generator circuits and in particular relates to arrangements for protecting high frequency generators such as electronic tube oscillators from overvoltage or overcurrent when portions of their resonant load circuits arc-over or are short circuited. One particular instance where our invention is useful is in protection of radio frequency heating generators from the effects of sudden load changes.

To meet commercial demands for high frequency heating of dielectric loads it is necessary to employ electron-tube oscillators of very high voltage, and it has often been found to be impracticable to design tubes for this purpose that can operate over the required no-load to full-load range without the provision of some form of regulator to hold down the tank circuit voltage when the load approaches zero. Both manual and automatic regulators have been devised for this purpose, but none of these have proved rapid enough in action to prevent high tank circuit voltages, when load change is due to arcing in the load tuning circuit or to mistuning of the load circuit.

It is an object of our invention to provide a novel type of regulator which is quickly enough responsive to changes in the load circuit to prevent overvoltage even when arc-overs occur in the portions of the load.

Another object of our invention is to provide a regulator which is responsive to the rate of change, as distinct from the absolute magnitude, of voltage or current in the load circuit.

Still another object is to provide a novel type of control apparatus for the plate circuit of radio frequency heating generators.

Other objects of our invention will become apparent upon reading the following description taken in connection with the drawings in which.

Figure 1:
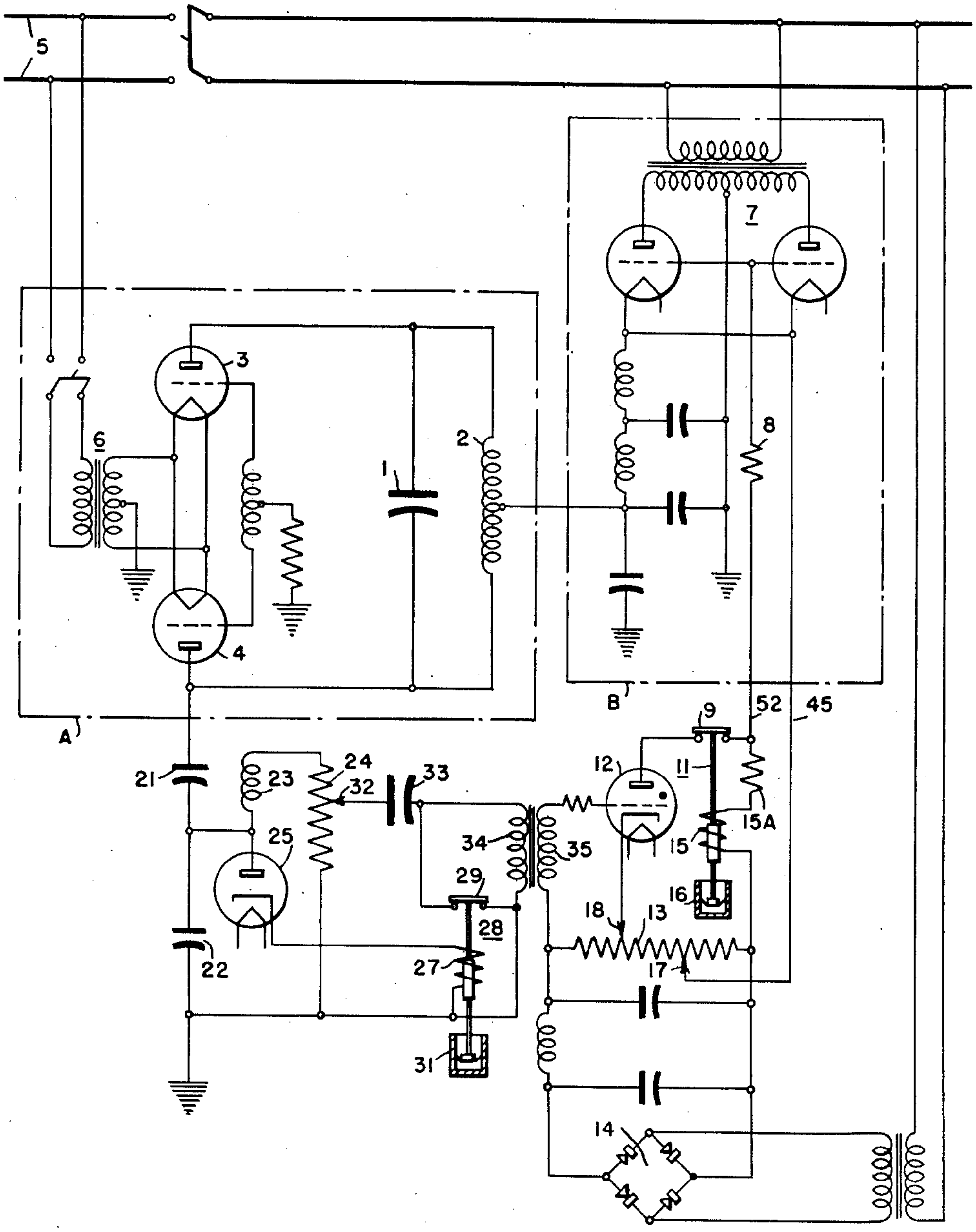
Figure 1 is a schematic diagram of a high frequency heating circuit supplied from a tube-type generator having a regulator responding to rapid rate of change of voltage of the load.

Referring in detail to Fig. 1, a load comprising a dielectric load member 1 to be heated is shown for simplicity as forming a resonant tank circuit with an inductor 2, which shunts the anodes of a pair of grid controlled electron tube generators 3 and 4 connected to form a push-pull oscillator in any way well known in the art. Said load 1 can be connected to any type of oscillator (single ended or push-pull) by any of the means known to the art such as through capacitive or inductive coupling, through a transmission line, or directly connected into the tank circuit as shown. The manner of connection does not change the basic operation of the circuits embodied herein. The cathodes of the oscillator are heated from a low frequency power circuit through a transformer 6 having the midpoint of its secondary grounded. Plate current for the tube generators 3 and 4 is derived from a conventional full-wave rectifier 7 supplied from the power supply 5, the positive terminal of the rectifier 7 being connected to the midpoint of inductor 2, and its negative terminal being grounded. The rectifier 7 is provided with a pair of control electrodes which are connected through a suitable limiting resistor 8 and the normally-closed contacts 9 of a relay 11 to the anode of a triode 12, such as a gaseous discharge device of the thyratron type. The triode 12 is supplied with plate current passing through contacts 9 from a variable voltage divider which is energized with direct current by a rectifier 14 supplied with energy from the supply lines 5. The operating coil 15 of the relay 11 is traversed by the plate current of the thyratron 12 and a time delay device 16 of conventional type prevents the opening of relay contacts 9 until a predetermined interval after plate current flow is initiated in triode 12 as described below. The positive terminal of rectifier 7 is connected to an adjustable tap 17 on the voltage divider 13, and the cathode of thyratron 12 is connected to another adjustable tap 18 on said voltage divider.

A pair of capacitors 21, 22 are connected in series between one terminal of the load circuit 1, 2 and ground, and a voltage proportional to the load voltage is thus impressed across a channel comprising a radio frequency choke coil 23 and a potentiometer 24. A rectifying diode 25 is connected in series with the actuating coil 27 of a relay 28 and is connected in shunt to the choke coil 23 and potentiometer 24; this arrangement causes a direct current proportional to the load voltage to traverse the actuating coil 27. The relay 28 has a pair of contacts 29 which open when its actuating coil is energized, and is also provided with a time delay 31 which prevents the opening of contacts 29 for a predetermined time interval after current flow is initiated through diode 25.

Between an adjustable tap 32 on potentiometer 24 and the ground are connected in series a capacitor 33 and the primary winding 34 of a transformer having a secondary winding 35 which is connected between the negative end of voltage divider 13 and the control grid of thyratron 12. The contacts 29 of relay 28 are connected in shunt with the primary winding 34.

The mode of operation of the Fig. 1 circuit is as follows; assume that the generators 3 and 4 are operating to supply high frequency heating current of substantially steady magnitude in the tank circuit 1, 2. The steady voltage applied across capacitor 22 causes a steady direct current to flow through potentiometer 24, actuating winding 27 of relay 28 and diode rectifier 25. This current through actuating winding 27 is sufficient to hold the contacts 29 open, but the capacitor 33 prevents the direct-current voltage drop in potentiometer 24 from sending current through the primary winding 34. The secondary winding 35 thus has no voltage induced in it, and the voltage drop between the tap 18 on voltage divider 13 and its negative terminal is, by adjustment, sufficient to prevent current flow through the plate circuit of thyratron 12. The actuating winding 15 of relay 11 thus stands deenergized and the contacts 9 thereof stand closed. The voltage drop between the variable tap 17 on voltage divider 13 and its positive terminal impresses a positive voltage on the control electrodes of rectifier 7 relative to the cathode thereof, and by adjustment of tap 17 this voltage has been made sufficient to cause the desired current to flow through the load circuit 1, 2 from generator 3, 4.

Now suppose a sudden change were to occur in the electrical impedance of dielectric load 1, such for example as an arc-over through a portion, or all, of it, This will, in general, cause a sudden change in the load voltage, and correspondingly a sudden change in the current sent through potentiometer 24 by capacitor 22. The corresponding sudden voltage fluctuation impressed on the channel containing tap 32, capacitor 33 and primary winding 34 will induce a voltage in secondary winding 35 and cause the control electrode of thyratron 12 to go sufficiently more positive to render triode 12 conductive. When this happens the voltage drop through resistor 15A impresses a negative voltage in the circuit of the control electrodes of rectifier 7 and blocks current flow through rectifier 7 to the generator tubes 3 and 4. The supply of energy to the load circuit 1, 2 ceases.

Once started, thyratron 12 remains conductive until its plate circuit is opened. Its plate current flows at once, of course, through actuating winding 15 of relay 11, but the time-delay unit 16 retains the contacts 9 closed for a definite interval, and during that interval no power is supplied to load circuit 1, 2 by generator tubes 3, 4. At the end of that time interval the contacts 9 open and stop current flow through thyratron 12, thereby removing the negative voltage impressed by the voltage drop in resistor 15A on the control electrodes of rectifier 7. The latter then again energizes generator tubes 3, 4 to supply power to the load circuit 1, 2. The time delay imposed by unit 16 is adjusted to be sufficient so that any arc-over in the dielectric member 1 has had time to be extinguished.

Opening of contacts 9 deenergizes the actuating winding 15 of relay 11 so it falls back to the position it originally had before the load fluctuation occurred and the entire system stands in its steady state condition again as described above.

The relay 28 operates only in starting the heating originally. When the main switches first connect the system to the power line 5, there is of course a sudden voltage jump in the capacitor 22 which would, unless provided against, induce a voltage in secondary winding 35 and act through thyratron 12 to energize relay 11 and block rectifier 7. The relay 28 prevents this undesired action because its contacts 29 short circuit the primary winding 34 until capacitor 22 has been energized long enough for actuating winding to overcome the time delay impressed by time delay unit 31. Once this time has expired, relay 28 holds the contacts 29 in the open condition described above until the generator 3, 4 has been deenergized for a considerable interval.

Figures 2, 3:
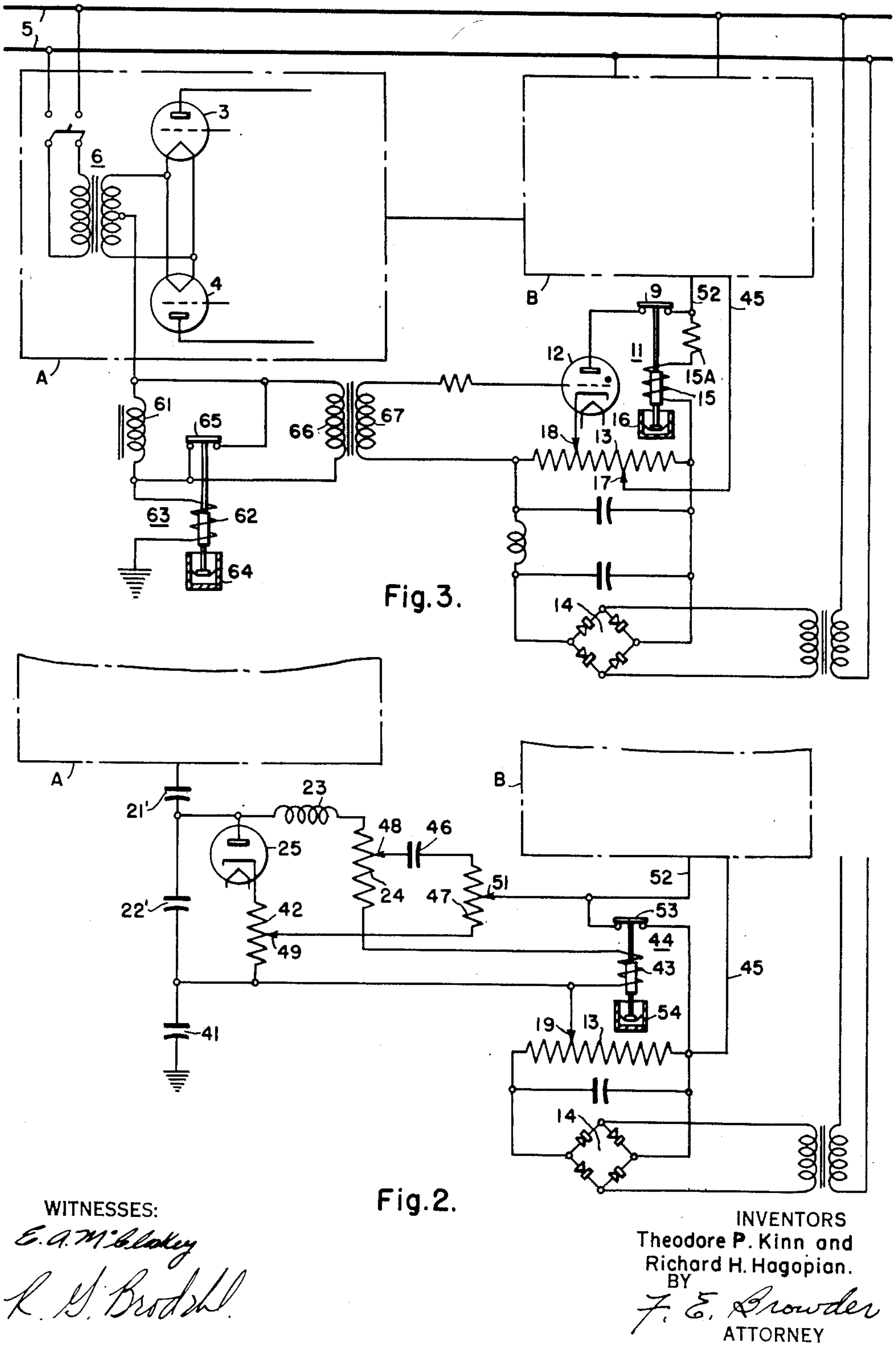
Fig. 2 is a similar diagram employing a regulator which responds to rapid rate of change of current through the load.
Fig. 3 shows a modified circuit arrangement.

Fig. 2 shows a modification of the Fig. 1 circuit in which the use of the isolating transformer comprising windings 34 and 35 between the load voltage responsive control tube 25 and the control electrodes of rectifier 7 is avoided with some consequent cheapening in system cost. However, the control tube 25 and its attendant circuits are at around the high potential above ground of the cathodes of rectifier 7 and this is so great a disadvantage in the case of many heating systems as to more than offset the increased simplicity over the Fig. 1 circuit.

Since much of the generator and supply rectifier circuits is the same as in Fig. 1, the latter have been enclosed in dot-dash rectangles, A and B, and the contents of these rectangles has not been repeated in detail in Fig. 2, but merely indicated, for the sake of simplicity, by the rectangles themselves.

Thus, the lead wire passing from generator 4 in Fig. 1 through the dot-dash outline A to capacitor 21 is represented by a line passing from dot-dash rectangle A in Fig. 2 to capacitor 21′. The two leads 45 and 52 passing respectively through dot-dash rectangle B in Fig. 1 from the control electrodes and cathodes of rectifier 7 have their counter parts in the similar two leads 45 and 52 passing through dot-dash rectangle B in Fig. 2.

Referring, then, to Fig. 2 the capacitors 21′, 22′ and 41 are connected in series between one terminal of the load 1, 2 and ground. The capacitor 22′ is shunted by a diode 25 in series with a resistor 42, and also by a channel comprising a radio frequency choke coil 23, a potentiometer 24 and the actuating winding 43 of a relay 44. A voltage divider 13 supplied with direct current by a rectifier 14 has its positive terminal connected to the cathodes of the rectifier 7 by a lead 45. A variable tap 10 on voltage divider 13 is connected to the common junction of capacitors 22′ and 41. A capacitor 46 in series with a potentiometer 47 is connected between a variable tap 48 on potentiometer 24 and a variable tap 49 on resistor 42. A variable tap 51 is connected by a lead 52 to the control electrodes of rectifier 7. The relay 44 has a pair of separable contacts 53 connected to interconnect, when closed, the lead wires 45 and 52; and also has a time delay unit 54.

The mode of operation of the Fig. 2 circuit will, it is believed, be evident from the following explanation. Until voltage is applied to the load 1, 2 by the generators 3, 4 there is no voltage drop across the terminals of capacitor 22′ and no current flows through the actuating winding 43 of relay 44. The contacts 53 of the latter are closed and place the control electrodes of rectifier 7 at the same potential as its cathodes. Upon applying voltage from power supply 5 to the heating system the rectifier 7 impresses direct current voltage on the plates of generator tubes 3 and 4, and radio frequency voltage is impressed across the load 1, 2. A fraction of this load voltage is impressed by capacitor 22′ on the network comprising diode 25, resistor 42, actuating winding 43, potentiometer 24 and choke coil 23, thus energizing the actuating winding of relay 44 with direct current. However, the time delay unit 54 prevents the contacts 53 from opening for a predetermined time interval. While the rapid voltage change across the terminals of capacitor 22′ causes capacitor 46 to transmit a current pulse through resistor 47, the closed contacts 53 insure that no portion of this is impressed between the control electrodes and cathodes of rectifier 7 to block plate current flow in generators 3, 4.

The time delay unit 54 is adapted for adjustment to permit the direct current sent through actuating winding 43 by capacitor 22′ diode 25 and potentiometer 24 to open contacts 53 after the component of the current through potentiometer 24 has died away. Since the current in potentiometer 24 and resistor 42 has reached a steady state, no current flows through capacitor 46 and potentiometer 47. The potential difference between the control electrodes and cathodes of rectifier 7 is then equal to the sum of the direct current drops between the variable tap 49 on resistor 42 and its lower terminus and 19 on voltage divider 13 and its right-hand terminus; these voltage drops are adjusted to cause the rectifier 7 to impress the desired plate voltage on generators 3, 4.

If now a sudden arc-over or other change in load impedance occurs in the load circuit 1, 2 and produces a corresponding sudden jump in the potential drop through capacitor 22′, the current through resistor 42 and potentiometer 24 will undergo a corresponding sudden jump. The potential drops between adjustable taps 49 and 51 undergo a corresponding sudden fluctuation and this results in capacitor 46 transmitting a sudden transient current which produces a voltage drop between the tap 51 and the lower end of potentiometer 24, which voltage drop is added to those described above as impressed between the control electrodes and cathodes of rectifier 7. The tap 51 is set in such a position on potentiometer 47 that the rectifier 7 is thus blocked for the duration of the transient current through capacitor 46. This interval interrupting the supply of power from the generators 3, 4 to the load circuit 1, 2 suffices to interrupt the arc-over in the load circuit; and the disappearance of the transient voltage drop at tap 51 restores normal voltage between the control electrodes and cathodes of rectifier 7. Normal voltage is again impressed by rectifier 7 on the plates of generators 3, 4 and heating of the load 1, 2 proceeds normally until a fresh arc-over or other load disturbance intervenes.

Fig. 3 shows a modification of our invention in which the plate voltage of the generators 3, 4 is blocked off in response to sudden changes of generator plate current resulting from the arc-overs or other sudden changes in the load. In Fig. 3 the dot-dash rectangle B signifies the same rectifier circuit as appears within the rectangle B in Fig. 1; and the dot-dash rectangle A signifies the same generator load circuit except that, as indicated, the lead crossing the lower side of the rectangle leads from the midpoint of the generator cathodes to ground instead of from one side of the load circuit to ground.

The lead crossing the dot-dash rectangle A is connected to one terminal of an inductor 61, and the lower terminal of the latter is connected to ground through the actuating winding 62 of a relay 63 which has a time delay unit 64 and a pair of contacts 65 which are closed when the actuating winding 62 is deenergized. The inductor 61 is shunted by the contacts 65 and also by the primary winding 66 of a transformer having a secondary winding 67. A voltage divider 13 supplied with direct current through rectifier 14 from the power supply 5, has its positive terminal connected through the actuating winding 15, a resistor 15A, and the contacts 9 of a relay 11 to the anode of a thyratron 12. The cathode of thyratron 12 is connected to an adjustable tap 18 on voltage divider 13, and the secondary winding 67 spans its cathode and control electrode. The relay 11 is provided with a time delay unit 16. The lead 45 which passes from the cathodes of rectifier 7 through the lower side of dot-dash rectangle B is connected to an adjustable tap 17 on voltage divider 13, and the lead 52 which passes from the control electrodes of rectifier 7 through the lower side of dot-dash rectangle B is connected to one of the contacts 9 of relay 11 which is remote from thyratron 12.

The mode of operation of Fig. 3 circuits is as follows: When energizing voltage is first applied to the heating system from the power supply buses 5 the position of adjustable tap 17 on voltage divider 13 is such as to cause the rectifier 7 to impress plate voltage on generator tubes 3, 4 sufficient to start heating the load 1 with the desired power. The plate current of generator tubes 3, 4 will cause a current surge in inductor 61 but contacts 65 being held closed by the time delay unit 64 on relay 63, none of this current surge will traverse primary winding 66 or impress voltage on the control electrode of thyratron 12. The position of tap 18 on voltage divider 13 is such that under these conditions thyratron 12 is non-conductive. The time delay 64 on relay 63 is set to open contacts 65 only after the starting transients have disappeared from the plate current of generator tubes 3, 4 and the current through inductor 61 is a steady state direct current.

Now when an arc-over or other sudden change in impedance occurs in load circuit, 1, 2, the resulting sudden change in current through inductor 61 impresses a voltage on winding 66 and thence through winding 67 on the control electrode of thyratron 12 to render it conductive. The plate current of thyratron 12 impresses a voltage drop through resistor 15A between the cathodes and control electrodes of rectifier 7 and blocks the supply of plate voltage to generator tubes 3, 4, thereby affording the arc-over or other abnormal condition in load circuit 1, 2 time to disappear.

Soon the time delay unit 16 permits contacts 9 of relay 11 to open and render thyratron 12 non-conductive, thereby returning the control electrodes of rectifier 7 to clear normal voltage relative to their associated cathodes.

The rectifier 7 thus again impresses plate voltage on generator tubes 3, 4 and heating of the load continues as previously described until some fresh arc-over or similar abnormality occurs.

It will be noted that the voltages impressed by arc-overs on the control electrodes of rectifier 7 are proportional to the rate of change of load voltage or current in all these modifications of our invention, and do not have to wait upon the development of load voltages or currents to destructive magnitudes, but their protective action occurs quickly before destructive results have time to build up. In fact arc-overs too restricted to be very destructive immediately, but which would cause serious harm if allowed to occur in repeated succession, may be detected and corrected for by our protective system.

We claim as our invention:

1. In combination with a high frequency generator supplying a resonant load circuit for heating a load, a source of energizing voltage for said generator, a reactance element connected in parallel with said load, and a control means including a capacitor, said capacitor being connected in series with said reactance element and being energized by a sudden change in the voltage drop across said reactance element, said control circuit thereby impressing a control voltage through said capacitor to control the flow of current from said generator.

2. In combination with a high frequency generator supplying a resonant heating load circuit, a source of energizing voltage for said generator, a control circuit including a control means for said source, a capacitor, a rectifier, a relay member and a transformer having a secondary winding, said transformer having a primary winding supplied in series with said capacitor by said rectifier which draws energy from the load circuit, said relay having separable contacts and an actuating winding, with said secondary winding of the transformer being connected to energize serially each of said separable contacts, said actuating winding and the control means for said source.

3. In combination with a high frequency generator of the electron tube type supplying a heating load circuit of a type liable to arc-overs, a source of energizing voltage for said generator, a control circuit including a capacitor, a rectifier and a transformer having a primary and secondary, said transformer having its primary supplied in series with said capacitor by said rectifier which draws energy from the load circuit, a relay having separable contacts, said relay including a time delay unit and an actuating winding, a control means for said source of energizing voltage, a grid controlled gas filled tube having its grid connected to the secondary of said transformer and its principal electrodes connected in series with said separable contacts, said actuating winding and said control means.

4. In combination with a high frequency generator supplying a load circuit including a load of a type which is liable to arc-overs, a source of energizing voltage for said generator, and control means for said source, said control means being serially connected between said source and said load circuit, said control means being responsive to the rate of change of voltage in a portion of said load circuit, said control means provided with a delay means for terminating for a predetermined period of time the flow of current from said source of energizing voltage to said generator.

5. In combination with a high frequency generator supplying a load of a type which is liable to arc-overs, a reactance element connected in parallel with said load, a source of energizing voltage for said generator, a control means for said source, said control means including a capacitor, with said capacitor connected in series with said reactance element, said capacitor being energized by the voltage drop across said reactance element, said control circuit thereby impressing voltage through said capacitor to control the current flow from said source to said generator.

6. In combination with a high-frequency generator of the electron tube type supplying a load circuit including a load which is liable to arc-overs, a source of energizing voltage for said generator, and a control circuit for controlling said source of energizing voltage, said control circuit including a capacitor and an interrupter circuit containing a delay member, said capacitor being connected in series with a portion of said load circuit and being responsive to the rate of change of voltage in a portion of said load circuit, said interrupter circuit effectively connected to said capacitor and being operable to terminate for a period of time the flow of current from said source when said arc-overs occur, the said period of time being determined by said delay member.

7. In combination with a high frequency generator of the electron tube type supplying a dielectric heating load, a source of energizing voltage for the principal electrode of said generator, a reactance element connected in parallel with said load, and a control means including a capacitor, said capacitor being connected in series with said reactance and being energized by the voltage drop across said reactance element, said control circuit thereby impressing a control voltage through said capacitor to control said source of energizing voltage.

8. In combination with a high frequency generator of the electron tube type having a plurality of electrodes and supplying a dielectric heating load, a source of energizing voltage for the principal electrodes of said generator, an impedance member, circuit means for supplying rectified current from a portion of the circuit of said dielectric heating load to said impedance member, a transformer having a primary and a secondary, a capacitor in series with the primary of said transformer and energized by the voltage drop through said impedance, a grid controlled gas discharge tube having principal electrodes and having its control grid connected to the secondary of said transformer, a relay having an actuating winding and a pair of separable contacts, a control device for said source of energizing voltage, with the latter gas discharge tube having its principal electrodes connected in series with the actuating winding and the pair of separable contacts of said relay and with said control device and a time delay unit operable with said relay.

References Cited in the file of this patent

UNITED STATES PATENTS

| | | |
|---|---|---|
| 2,448,541 | Maxson | Sept. 7, 1948 |
| 2,454,618 | Stone | Nov. 23, 1948 |
| 2,545,997 | Hagopian | Mar. 20, 1951 |
| 2,548,246 | Walstrom | Apr. 10, 1951 |
| 2,594,420 | Gillespie | Apr. 29, 1952 |
| 2,623,176 | Witsenburg et al. | Dec. 23, 1952 |
| 2,707,742 | Juhola | May 3, 1955 |

FOREIGN PATENTS

| | | |
|---|---|---|
| 439,166 | Great Britain | Dec. 2, 1935 |